United States Patent
Bao et al.

(10) Patent No.: US 6,526,093 B1
(45) Date of Patent: Feb. 25, 2003

(54) METHOD AND APPARATUS FOR EQUALIZING A DIGITAL SIGNAL RECEIVED VIA MULTIPLE TRANSMISSION PATHS

(75) Inventors: Jay Bao, Bridgewater, NJ (US); Parthapratim De, Millburn, NJ (US); Tommy C. Poon, Murray Hill, NJ (US)

(73) Assignee: Mitsubishi Electric Research Laboratories, INC, Cambridge, MA (US)

( * ) Notice: Subject to any disclaimer, the term of this patent is extended or adjusted under 35 U.S.C. 154(b) by 0 days.

(21) Appl. No.: 09/262,377

(22) Filed: Mar. 4, 1999

(51) Int. Cl.[7] .................................................. H03H 7/40
(52) U.S. Cl. ........................ 375/233; 375/232; 375/350; 708/323
(58) Field of Search ................................. 375/229, 230, 375/231, 232, 233, 240.02–240.07, 346, 349, 350; 708/322, 323; 333/18

(56) References Cited

U.S. PATENT DOCUMENTS

| | | | |
|---|---|---|---|
| 5,297,165 A | * 3/1994 | Ueda et al. | 375/230 |
| 5,327,459 A | * 7/1994 | Hara et al. | 375/232 |
| 5,329,472 A | * 7/1994 | Sugiyama | 708/322 |
| 5,526,378 A | 6/1996 | Knutson et al. | 375/229 |
| 5,550,596 A | 8/1996 | Strolle et al. | 348/607 |
| 5,572,262 A | 11/1996 | Ghosh | 348/607 |
| 5,748,674 A | * 5/1998 | Lim | 375/233 |
| 5,799,037 A | 8/1998 | Strolle et al. | 375/233 |
| 6,144,697 A | * 11/2000 | Gelfand et al. | 375/233 |

OTHER PUBLICATIONS

Gary Sgrignoli & Gopalan Krishnamurthy; "VSB Digital Transmission over MMDS Channels for the Wireless Cable Digital Alliance"; Zenith Electronics Corporation; pp. 1–25, 1995.
"ATSC Digital Television Standard"; www.kjmbc.co.kr/beta/8vsb/; 1995.

* cited by examiner

Primary Examiner—Stephen Chin
Assistant Examiner—Chieh M. Fan
(74) Attorney, Agent, or Firm—Dirk Brinkman; Andrew J. Curtin

(57) ABSTRACT

In a receiver, an adaptive decision feedback equalizer receives broadcast signals having multipath interference. The equalizer includes a feed-forward, a feedback, and a partial feedback forward filter. The equalizer also includes a slicer and two accumulators. An output from the slicer is processed by the feedback filter and the partial feedback filter. The output from the feedback filter is subtracted from output of the feed-forward filter to form the input to the slicer, and the output of the partial feedback filter is subtracted from the received signal to form the input for the feed-forward filter to reduce the multipath interference.

10 Claims, 5 Drawing Sheets

501: $C_{SK} = \sum_{-L}^{L} c_n E_{k-n} + n_k$

502: $E_k = \sum_{-L}^{0} a_n C_{SK-n} + \sum_{0}^{M} b_n \overline{E}_{k-n}$

503: $C_{SK} = C_{SK} - \sum c_n E_{k-n}$

504: $E_k = \sum_{-L}^{0} a_n C_{SK-n} + \sum_{0}^{M} b_n \overline{E}_{k-n}$

505: $C_{n+SK} = \sum_{0}^{L} c_n E_{k+n-m} + n_{k-n}$

506: $\overline{C}_{SK} = C_{SK} - \sum_{L+1}^{M} c_n \overline{E}_{k-n}$

507: $E_k = \sum_{-L}^{0} a_n C_{SK-n} + \sum_{1}^{M} b_n \overline{E}_{k-n}$

METHOD AND APPARATUS FOR EQUALIZING A DIGITAL SIGNAL RECEIVED VIA MULTIPLE TRANSMISSION PATHS

FIELD OF THE INVENTION

This invention relates generally to digital signal receivers, and more particularly to adaptively equalizing received digital signals.

BACKGROUND OF THE INVENTION

Recently, television broadcasters have begun transmitting digital television (DTV) signals as a packetized data stream which is standardized by the Advisory Committee on Advanced Television Service, see "ATSC Digital Television Standard," 1995. In the United States, trellis coded vestigial sideband modulation (8 VSB) is typically used for DTV transmissions, see "VSB Transmission System", Zenith Corporation, pp. 1–25, 1995. For cable systems, digital television broadcasting will use QAM or 16 VSB modulation.

DTV transmission over terrestrial broadcast channels poses special problems. The high data rates, coupled with time-varying channel responses spanning hundreds of symbols, implies that high performance demodulation is difficult to achieve. A particular challenge for terrestrial DTV television receiver designers is correcting static and dynamic multipath impairments. A typical receiver is expected to handle multipath with delays as long as 18 microseconds.

A decision feedback equalizer (DFE), because of its relatively low complexity and near optimal performance, is potentially a good solution to the problem. However, even the DFE can be overly complex when delay spreads extending over hundreds of symbols are encountered. After all, a DFE can only cancel multipaths up to the number of taps in the feedback filter.

At a symbol rate of 10.76 Mbits per second, adaptive equalizers with lengths of several hundred taps are required. In addition, to combat dynamic multipaths due to propagation effects such as flutter from moving objects, e.g., airplanes, and changing atmospheric conditions, the equalizer must update its coefficients at a high speed.

To meet this challenge, prior art equalizers are typically implemented in hardware. This means that a large number of arithmetic units are required, Thus, prior art equalizers are relatively highly complex. Complexity implies processing delays. In addition, the power consumption of such equalizers is very high, due to the large number of concurrently operating arithmetic logic units.

Therefore, it is desired to provide a method an apparatus for adaptively filtering digital signals, with shorter acquisition times to better respond to dynamic multipath impairments.

SUMMARY OF THE INVENTION

Provided are a decision feedback equalizer (DFE) method and apparatus for digital receivers. In one aspect, the equalizer according to the invention exploits the sparse channel characteristics of terrestrial digital television transmission, and the profile of multipath impairments. The invention uses a least mean square (LMS) method for updating equalizer coefficients.

The complexity of coefficient updating is reduced as follows. The step size of a coefficient updating process is multiplied by a weighting parameter w. The value of w can be either 0 or 1, depending on the equalizer tap location. Only taps with substantial energy and their neighboring taps have w equal to 1, the remaining taps have w equal 0. Those taps with zero weighting are not updated. The locations of non-zero weighting taps are determined during initialization, when all taps are updated for several iterations so that tap energy level can be calculated. The energy of the non-zero weighting taps is continuously monitored. Zero weighted taps may need to be updated later if dynamic ghosts are detected.

In another aspect of the invention, dynamic ghosts are tracked. For taps with w equals to 0, the invention applies a threshold update step to update w for those taps that are affected by dynamic ghosts. A convergence quality Q, defined as the difference in RMS values between current iteration and the running average RMS values for the past N iterations, is used to gauge the direction of the convergence, and to update the step size of the coefficient updating.

More specifically, in a digital receiver, an adaptive decision feedback equalizer receives signals having multipath interference. The equalizer includes a feed-forward, a feedback, and a partial feedback filter. The equalizer also includes a slicer and two accumulators. An output from the slicer is processed by the feedback filter and the partial feedback filter. The output from the feedback filter is subtracted from output of the feed-forward filter to form the input to the slicer, and the output of the partial feedback filter is subtracted from the received signal to form the input for the feed-forward filter to reduce the multipath interference.

BRIEF DESCRIPTION OF THE DRAWINGS

FIG. 5 diagrams calculations performed by the equalizer of FIG. 2.

DETAILED DESCRIPTION OF THE PREFERRED EMBODIMENT

System Overview

Figure 1:
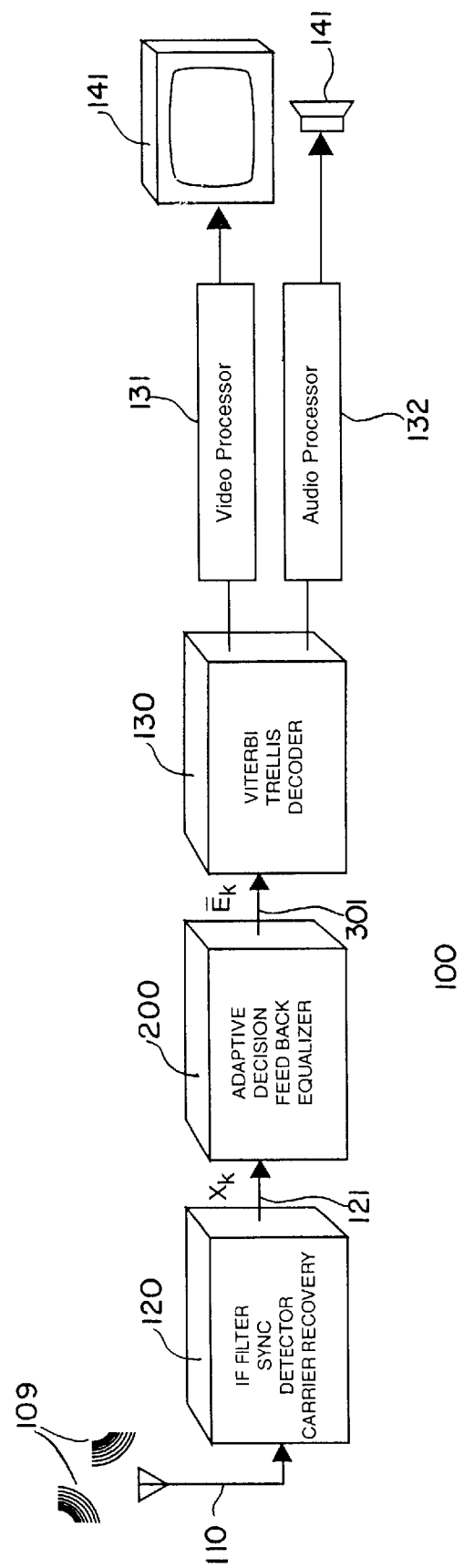
FIG. 1 is a block diagram of a portion of a digital television receiver including an adaptive equalizer according to the invention.

FIG. 1 is a block diagram of a portion of a digital television receiver 100 including a decision feedback equalizer 200 according to our invention. In our example digital receiver 100, pulse amplitude modulated (PAM) signals are received and processed. The PAM signals can include QPSK or vestigial sideband (VSB) input signals. It should be understood that the invention can also be used with 64-QAM signals. The invention can also be used with other types of digital receivers, for example, cellular telephones, and cable receivers. For cable systems, digital broadcasting uses QAM or 16 VSB modulation. A broadcast high definition PAM television signal 109 is received by an antenna 110. As illustrated, the signal 109 can arrive at the antenna via multiple paths having dynamically varying electrical lengths. Our invention adaptively corrects for any static and dynamic multipath impairments due to environmental and structural conditions in the signaling paths.

Accordingly, the received signal is processed by an intermediate frequency (IF) filter and synchronous detector 120. The unit 120 can include a tuner, a down-converter for converting the received signal to a lower frequency band above baseband, a carrier recovery circuit, automatic gain control networks, and an analog-to-digital converter. The unit 120 can also include an NTSC filter to separate out analog components.

The DFE 200, described in greater detail below, receives a filtered baseband input signal ($X_k$) 121 from unit 120 at a rate of 10.76 Mbits per second. The DFE 200 corrects for multipath impairments. The DFE 200 produces an equalized output signal ($\overline{E}_k$) 201. The output signal can be decoded before being applied to a transport processor. The transport processor, via processors 131–132, extracts audio and video information from the packetized data stream, for example, MPEG, for rendering on output devices 140–141.

Subspace-Based Equalizer Using Channel Sparseness

We describe a method and apparatus that can be used in the decision feedback equalizer 200 to correct for multipath impairments. Our invention exploits the sparse channel characteristics of terrestrial digital television transmission, and the profile of multipath impairments. We choose a variation of the least mean square (LMS) method for equalizer coefficient updating.

By exploiting sparseness, we state that in an equalizer, wherein several hundred taps span over tens of microseconds of the signal, most of the time only the main signal will generate any significant amount of energy at one of the taps. Most of the taps will generate no energy at all. Some of the taps will generate some energy due to multipath reflected signals. We retain the main signal usually at one of the taps (this is what is called equalizing). The multipath, or ghost signals, at a few other taps, we reject.

The distance, in tap counts or time, between the main signal and the ghost signals, translates directly to the delay of arrival at the antenna of the receiver between the main and ghost signals. For example, if we receive a signal that is bounced off a tall building, in addition to the main signal, and the path difference between the two paths is about 1000 ft, then we would expect a ghost signal about one microsecond later, or about 10 taps from the main signal.

According to our invention, complexity reduction in our equalizer is achieved as follows.

Equalizer Structure

Figure 2:
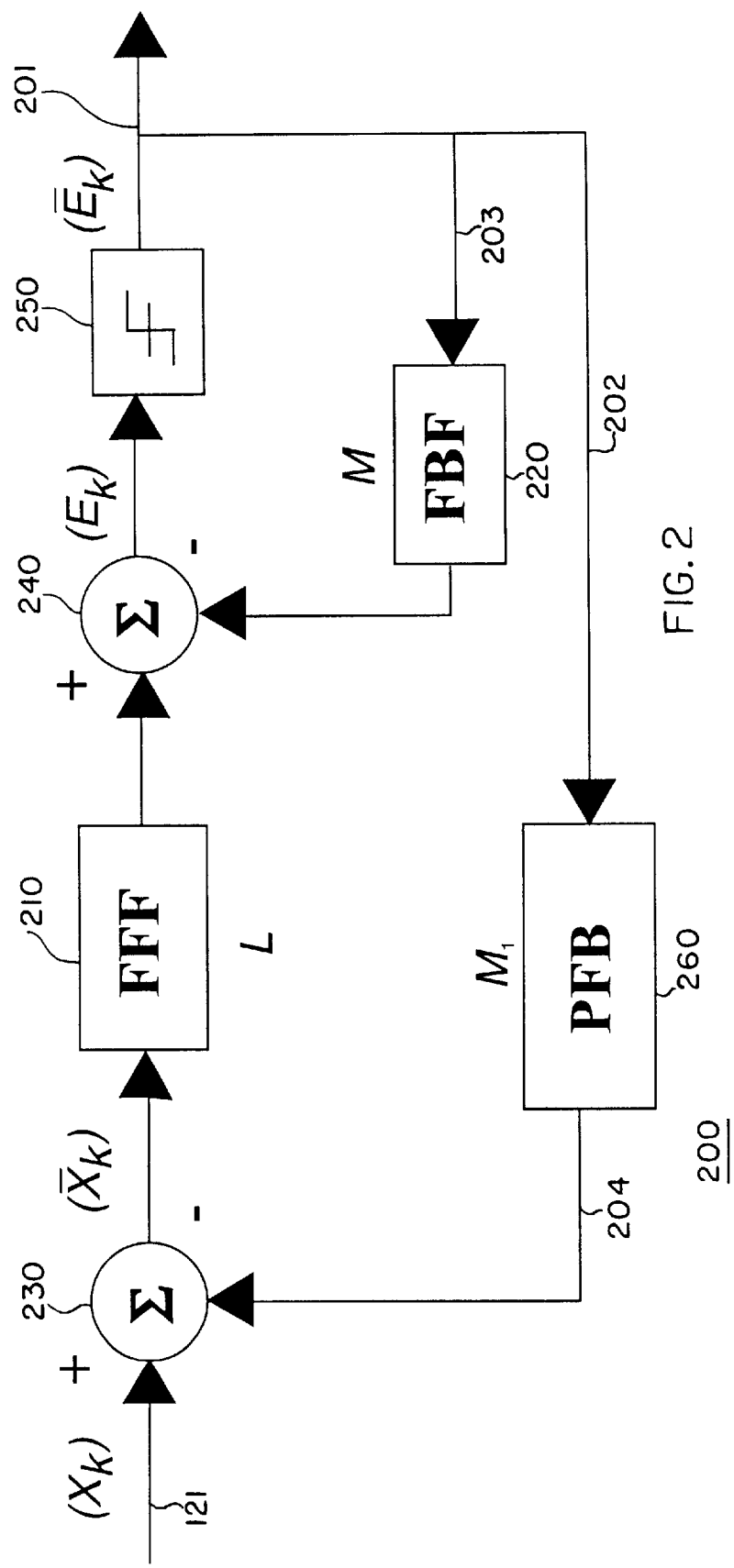
FIG. 2 is a block diagram of a decision feedback equalizer according to the invention.

As shown in FIG. 2, our equalizer 200 includes a feed-forward filter (FFF) 210, a feedback filter (FBF) 220. The FFF has L taps ($f_0, \ldots, f_{L-1}$) where L is, for example, 64, and the FBF has M taps ($b_0, \ldots, b_{M-1}$), where M is 192. By dynamically adjusting tap coefficients, the mean squared estimation error can be reduced to a minimum value. As a characteristic of our invention, the adjustment is windowed taking advantage of channel sparseness.

The DFE also includes two accumulators ($\Sigma$) 230, 240, each having an additive (+) and subtractive (−) side, and a slicer 250. The slicer produces output symbols at their expected coordinates.

A large majority of the ghosts signals, due to multipaths, are within the coverage of the feed-forward portion of the equalizer. However, the feedback portion is typically three or more times longer than the feed-forward portion. Therefore, we introduce a partial feedback portion (PFB) 260, which is a subset of the FBF. In this example, the portion that is partially replicated in the PFB is the first 64 taps of the FBF.

The input 202 to the PFB is identical to the input 203 of the FBF. The output 204 of the PFB is subtracted from the received signal 121 to produce the input 121 to the FFF. In other words, we "partially" adjust the input signal in a feedback loop. During the first few iterations, typically tens, while an initial condition is established, only the FFF and FBF are switched on. As an advantage of our configuration, the calculation loads of the FFF and the FBF are significantly reduced.

Tap Coefficient Determination

Figure 3:
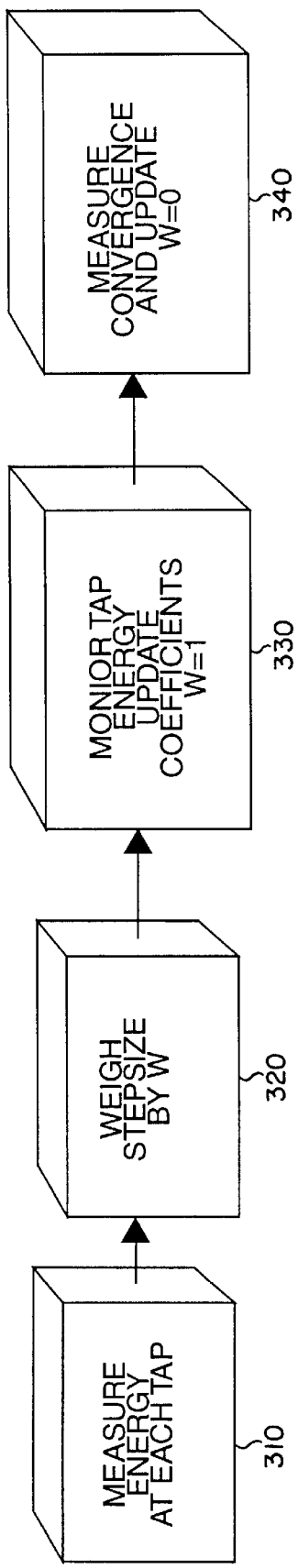
FIG. 3 is a flow diagram of a method applied to the equalizer of FIG. 2.

As shown in FIG. 3, our method 300 first measures (310) the amount of energy at each tap during initialization, for example, the first tens of iterations. The step size of the coefficient at each tap is multiplied (320) by a weight parameter w. The value of the weight parameter w can either be 0 or 1, depending on the location of the equalizer tap. Only taps with substantial energy and their immediate two adjacent taps have w equal to 1, all other taps have w equal 0. For example, the threshold energy for weighting can be $4\times10^{-2}$. Generally, the energy E at the ith tap is the square of the tap coefficient C, e.g.:

$$E(i)=C(i)^2.$$

Subsequently, the energy of the non-zero weighting taps is continuously monitored, and the coefficients are updated, while taps with zero weighting are not updated, unless dynamic ghost signals are detected.

Second, our method tracks dynamic ghost signals. For taps with w equals to 0, we apply a threshold update step 340 to update w for those taps that are affected by dynamic ghosts. A convergence quality Q, defined as the difference in RMS values between a current iteration and the running average RMS values for the past N iterations, is used to gauge the direction of the convergence, and to update the step size accordingly, and to find additional taps that need to be updated.

Third, we apply our method steps to our decision feedback equalizer 200 using a multipath profile based on field test knowledge. By applying our method to the DFE 200 of FIG. 2, the calculation loads of our DFE is substantially reduced.

DSP Calculations

Calculations, as shown in FIG. 5 can be performed by a simple conventional digital signal processor. Conventionally, the kth input symbol to the DFE 200 is expressed by $C_{SK}$ 501, where $c_n$ is the coefficient of the nth tap of the FFF, and $n_k$ is noise associated with the kth symbol. Conventionally, the kth symbol input to the slicer 250 is $E_k$ 502. The coefficient of the nth tap of the FFF is $a_n$, the coefficient of the nth tap of the FBF is $b_n$, and the output of the slicer is $\overline{E}_k$, where $C_{SK-n}$ is the content of the nth tap of the FFF.

With the introduction of our PFB, the input to the FFF is modified to 503, and accordingly the modified input to the slicer is now 504. If we choose the taps of the PFB to be the same as the FFF, then the expression for the PFB is 505, where:

$$n=0, \ldots, L \text{ and } M_1\_L,$$

and $c_m$ is the coefficient of the mth tap of the PFB. Or, in other words, the expression for the PFB can be 506, and the input to the slicer becomes 507.

Results

Figure 4:
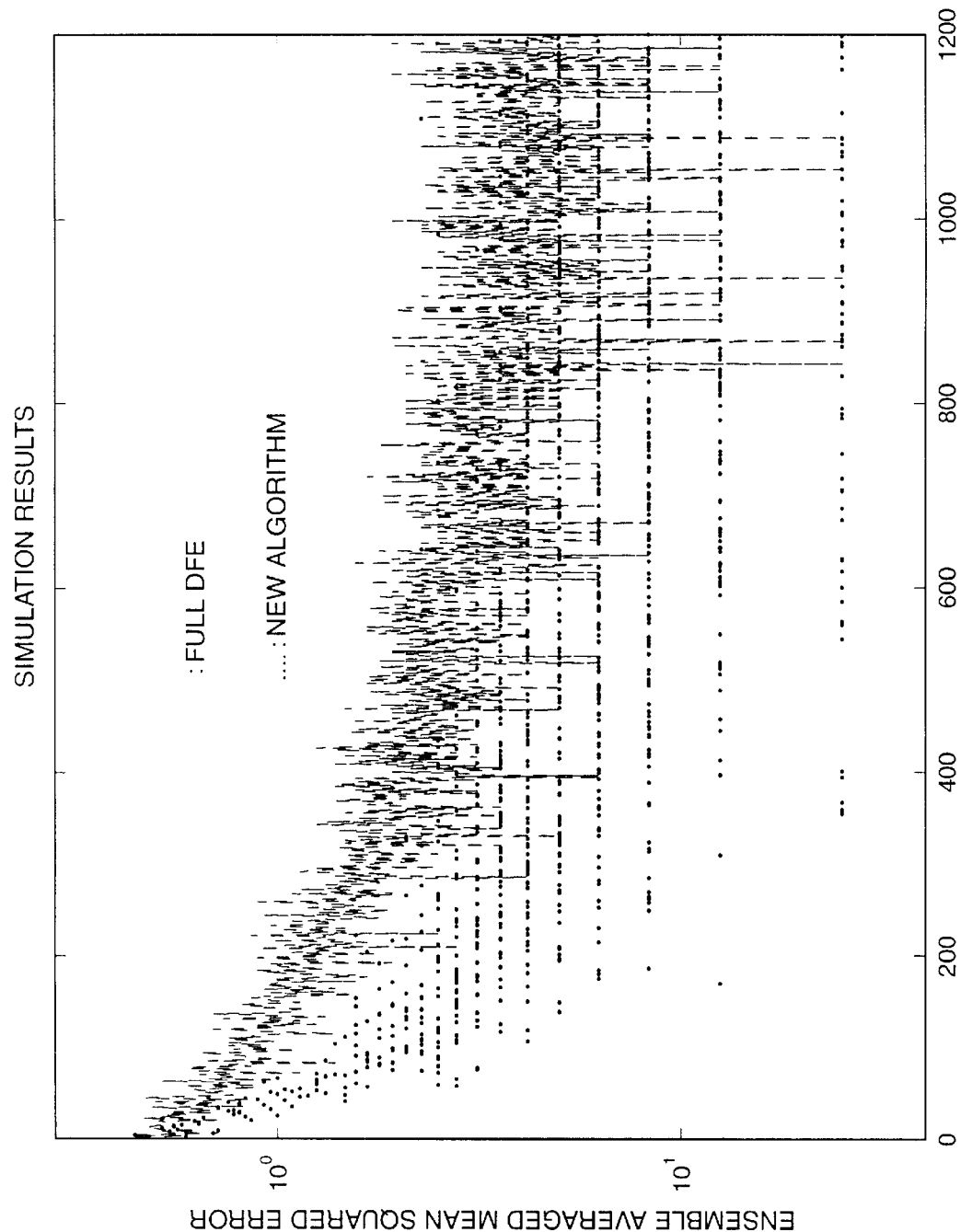
FIG. 4 is a graph comparing equalizer results.

FIG. 4 compares the average mean square error for a conventional DFE where all taps are updated, and the DFE 200 according to our invention with a partial feedback filter and weighted step sizes. In FIG. 4, the results for a prior art full DFE are shown by solid lines, and the DFE according to the invention results are shown with dotted lines.

With our DFE, the convergence speed is increased by a factor of eight. Our DFE also has 50% less final mean square error (MSE). Because of the improvement in speed, our DFE yields a substantially shorter acquisition time, and better response against dynamic multipath. In addition, the calculations required for our DFE can be done using a simple programmable digital signal processor.

Table 1 through 5 below, compare the DFE according to our invention with conventional equalizer approaches. Tables 1, 2, and 3 are for FIR equalizers only. In the tables, the column labeled "Full EQ" has the results for a conventional equalizer where all taps are updated at all times. The column "Window EQ" show the results for weighted updating.

The fully updated equalizer has 81 contiguous FFF taps. For each of the tables, an ensemble averaging of a hundred experiments was performed. Then, the mean of the ensemble averaged mean squared error was tabulated. The steady state mean, in the tables, was calculated as the mean (of the mean squared error) from iteration number 500 onwards. The first channel vector has a length of 40, and h(1)=+0.8445, h(40)=+0.0229, the noise variance is +0.1.

Table 1 summarizes results of a windowed method. Here, a fixed step size of +0.0075 was used.

TABLE 1

Full vs. Windowed equalizer

|  | Full EQ | Window EQ |
| --- | --- | --- |
| mean | 0.1895 | 0.1518 |
| steady state mean | 0.1453 | 0.1183 |

The effect of increased step-size in the windowed equalizer was next studied for the same noise level. The full EQ, with a step-size of 0.0045, and a windowed EQ, with a step-size of 0.01, were implemented. The windowed EQ exhibits much superior convergence speed. Table 2 shows results for the same noise level (x4), and increased multipath (x4), i.e., h(40)=0.0917. The noise variance is still +0.1.

TABLE 2

Full vs. Windowed equalizer with higher multipath.

|  | Full EQ | Window EQ |
| --- | --- | --- |
| mean | 0.1924 | 0.1534 |
| steady state mean | 0.1475 | 0.1198 |

Results for dynamic ghosts are summarized in Table 3. For this study, a second dynamic ghost of magnitude 0.0917, was introduced at tap 20 after 600 iterations, 600 iterations, i.e., h(20)=0.0917. The full equalizer was able to handle this dynamic ghost adequately. For reduced (windowed) equalizer, a measurement criterion called Robustness (R), defined as follows:

$$R(k) = \left| E(k) - 0.1 * \sum_{i=1}^{10} E(k-i) \right|$$

When R(k) is greater than a predetermined threshold, the equalizer switches back to training mode and finds additional taps that need to be updated. E(k) represents the ensemble averaged mean squared error for the kth iteration.

TABLE 3

Full vs. Windowed EQ, dynamic ghosts

|  | Full EQ | Window EQ |
| --- | --- | --- |
| mean | 0.1945 | 0.1545 |
| steady state mean | 0.1508 | 0.1244 |

Tables 4 and 5 are for decision feedback equalizer topologies. Table 4 is a summary of comparison of full, windowed, and partial feedback equalizer operating on the second channel.

TABLE 4

Comparisons of full, windowed, and partial feedback equalizer

|  | Full EQ | Window EQ | Partial feedback EQ |
| --- | --- | --- | --- |
| mean | 0.1462 | 0.1356 | 0.1346 |
| steady state mean | 0.1235 | 0.1153 | 0.1154 |

Different step sizes can be applied for the forward and feedback portion, respectively, to achieve best combination of convergence and stability. When combined with windowed and threshold methods, the partial feedback algorithm exhibits improvements of 58.54% in steady state mean squared error. These results are shown in Table 5.

Table 5 also illustrates the convergence speed of the different equalizer topologies. The speed is defined as the number of iterations needed for the ensemble averaged mean squared error to attain a value of 0.6. The channel used for Table 5 is h(1)=0.8445; h(2)= . . . =h(19)=0; h(20)=0.1834; h(21)= . . . =h(39)=0; and h(40)=0.0917. The noise variance is +0.1.

TABLE 5

Comparisons of full, windowed, and partial feedback EQ.

|  | Full DFE | Window DFE | Par. fdbk DFE | Par. fdbk + win. | Par. fdbk + win., large mu |
| --- | --- | --- | --- | --- | --- |
| Mean | 0.156 | 0.1443 | 0.1432 | 0.1332 | 0.0984 |
| steady state mean | 0.1324 | 0.1245 | 0.1217 | 0.1159 | 0.0899 |
| speed | 200 | 140 | 150 | 80 | 25 |

A full VSB equalizer configuration used with a large mu=+0.02 for the forward portion, and +0.00075 for backward portion.

We have described an improved adaptive decision feedback equalizers were we exploit the sparseness of the channel. We use channel estimation techniques, realized in a partial feedback block, to reduce the calculation loads of the decision feedback portion.

This is combined with a windowed method which allows for selective updating of taps where significant energy from multipath channel impairments have been found. The window sizes and locations are determined by threshold values that are calculated and updated continuously. Our equalizer reduces the calculation complexity by about a factor of ten compared to prior art approaches. The final mean square error is reduced by a factor of two.

Although, our invention has been described using a digital television receiver as an example, it should be understood that our invention can also be used to an advantage with other wireless receivers, such as, cellular telephones, and digital cable receivers, e.g., cable modems.

It is to be understood that various other adaptations and modifications may be made within the spirit and scope of the invention. Therefore, it is the object of the appended claims to cover all such variations and modifications as come within the true spirit and scope of the invention.

We claim:

1. In a receiver, an adaptive decision feedback equalizer for equalizing a received digital broadcast signal including multipath interference, comprising;

a slicer;

a feedback filter;

a partial feedback filter;

a feed-forward filter connected to each other so that an output from the slicer is processed by the feedback filter and the partial feedback filter, and an output from the feedback filter is subtracted from an output of the feed-forward filter to form an input to the slicer, and an output of the partial feedback filter is subtracted from the received signal to form an input to the feed-forward filter to reduce the multipath interference, and wherein each of the feedback filter, the partial feedback filter and the feed-forward filter includes a plurality of taps having associated coefficients;

means for only updating any taps of the plurality of taps of each of the feedback filter, the partial feedback filter and the feed-forward filter having a measured energy level above a predetermined threshold; and means for only updating taps adjacent to any taps of the plurality of taps of each of the feedback filter, the partial feedback filter and the feed-forward filter having a measured energy level above the the predetermined threshold.

2. The equalizer of claim 1 further comprising:

means for measuring an energy level at each tap of the feed-forward filter and each tap of the feedback filter; and means for multiplying a step size of a coefficient at each tap of the feed-forward and the feedback filter by a weight parameter w, where w is one when the measured energy level is above a predetermined level, and w is zero otherwise.

3. The equalizer of claim 2 wherein only coefficients of taps having the weight parameter w equal to one are updated.

4. The equalizer of claim 1 wherein the receiver is a digital television receiver.

5. The equalizer of claim 1 wherein the receiver is a cable receiver.

6. In a receiver, a method for adaptively equalizing a received digital broadcast signal including multipath interference, comprising the steps of:

filtering an output from a slicer by a feedback filter and a partial feedback filter;

subtracting an output from the feedback filter from an output of a feed-forward filter to form an input to the slicer;

subtracting an output from the partial feedback filter from the received signal to form an input to the feed-forward filter to reduce the multipath interference measuring an energy level at each tap of the feed-forward filter and each tap of the feedback filter; and multiplying a step size of a coefficient at each tap of the feed-forward and the feedback filter by a weight parameter w, where w is one when the measured energy level is above a predetermined level, and w is zero otherwise.

7. The method of claim 6 wherein only coefficients of taps having the weight parameter w equal to one are updated.

8. In a receiver, a method for adaptively equalizing a received digital broadcast signal including multipath interference, comprising the steps of:

measuring an energy level at each tap of a feed-forward filter and each tap of a feedback filter of an equalizer;

multiplying a step size of a coefficient at each tap of the feed-forward and the feedback filter by a weight parameter w, where w is one when the measured energy level is above a predetermined level, and w is zero otherwise; and accepting a main digital signal at taps of the feed-forward and the feedback filter having an energy level above the predetermined level, and rejecting ghost digital signals at all other taps.

9. The method of claim 8 wherein only coefficients of taps of the feed-forward and the feedback filter having the weight parameter w equal to one are updated.

10. In a receiver, an adaptive decision feedback equalizer for equalizing a received digital broadcast signal including multipath interference, comprising;

a slicer;

a feedback filter including a plurality of taps having associated coefficients, and means for only updating taps having a measured energy level above a predetermined threshold;

a partial feedback filter including a plurality of taps having associated coefficients, and means for only updating taps having a measured energy level above a predetermined threshold;

a feed-forward filter including a plurality of taps having associated coefficients, and means for only updating taps having a measured energy level above a predetermined threshold, the filters connected to each other so that an output from the slicer is processed by the feedback filter and the partial feedback filter, and an output from the feedback filter is subtracted from an output of the feed-forward filter to form an input to the slicer, and an output of the partial feedback filter is subtracted from the received signal to form an input to the feed-forward filter to reduce the multipath interference; and means for only updating taps of any of the filters adjacent to the taps of any of the filters having a measured energy level above the predetermined threshold.

* * * * *